United States Patent
Manakkal et al.

(10) Patent No.: US 7,916,774 B2
(45) Date of Patent: Mar. 29, 2011

(54) METHOD AND SYSTEM FOR ESTIMATING CHANNEL OF A MOBILE STATION IN A COMMUNICATION SYSTEM

(75) Inventors: Rajesh Raja Manakkal, Santa Clara, CA (US); Sam P. Alex, Santa Clara, CA (US); Louay Jalloul, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 819 days.

(21) Appl. No.: 11/900,499

(22) Filed: Sep. 12, 2007

(65) Prior Publication Data

US 2009/0069022 A1    Mar. 12, 2009

(51) Int. Cl.
*H04B 1/38* (2006.01)
(52) U.S. Cl. .................. 375/219; 375/316
(58) Field of Classification Search .......... 375/142–144, 375/148, 150, 347–349, 219
See application file for complete search history.

(56) References Cited

U.S. PATENT DOCUMENTS

| | | | |
|---|---|---|---|
| 6,320,897 B1 * | 11/2001 | Fattouche et al. | 375/130 |
| 6,353,598 B1 * | 3/2002 | Baden et al. | 370/280 |
| 2005/0078742 A1 * | 4/2005 | Cairns et al. | 375/148 |
| 2006/0256843 A1 * | 11/2006 | Grant et al. | 375/148 |
| 2008/0095141 A1 * | 4/2008 | Kong et al. | 370/345 |
| 2008/0130719 A1 * | 6/2008 | Bottomley et al. | 375/148 |
| 2008/0285595 A1 * | 11/2008 | Chester et al. | 370/482 |

* cited by examiner

*Primary Examiner* — Emmanuel Bayard
(74) *Attorney, Agent, or Firm* — McAndrews, Held & Malloy, Ltd.

(57) ABSTRACT

A method of estimating a channel between a desired Mobile Station (MS) and a Base Transceiver Station (BTS) antenna of a one of a plurality of sectors of a BTS. The method includes receiving a composite signal at the BTS antenna. The composite signal comprises a desired MS signal and an interfering MS signal. Thereafter, a known desired random sequence and a known interfering random sequence is applied to pilot symbols of the composite signal, resulting in a first de-randomized signal and a second de-randomized signal. Finally, the channel estimate is obtained by weighting and summing the first de-randomized signal and second de-randomized signal.

12 Claims, 5 Drawing Sheets

METHOD AND SYSTEM FOR ESTIMATING CHANNEL OF A MOBILE STATION IN A COMMUNICATION SYSTEM

BACKGROUND OF THE INVENTION

The present invention relates to channel estimation of a Mobile Station (MS) in a communication system. More specifically, the present invention relates to a method and system for channel estimation of a MS in presence of co-channel interference, to improve the performance of sector combining.

In a cellular like communication system, sectorization is used as a technique to increase the coverage and capacity of the system or network. A Base Station Transceiver (BTS) comprises multiple sectors, typically 3 sectors are used in a single BTS. A MS is served by a sector of a BTS in which the MS is located in. Each sector of a BTS has information to decode signals received from MSs served by it. The signals may be demodulated at the sector by multiplying the received signal by a pseudo random binary sequence (PRBS) (de-PRBS) which corresponds to the sector. Each sector may use a different PRBS for demodulating its signals. The signals from a MS may be received at one or more collocated or adjacent sectors of a BTS. The signals received at the sector and one or more collocated sectors of the same BTS may be received with different power levels due to different pathloss, shadowing and the angle that the MS makes with the boresight of sector antenna. Therefore, sector combining may be performed to combine the signals received from the MS at the BTS from multiple sectors, which improves the decoding reliability of the signal received from the MS. To achieve sector combining, the channel of the MS has to be estimated at the sectors of the same BTS. The signal received from the MS at one or more collocated sectors may be interfered by a signal received from one or more interfering MSs, which reduces the quality of channel estimation for the MS at one or more collocated sectors. As a result, the link performance of sector combining degrades.

SUMMARY

Various embodiments provide a method and system for estimating a channel between a desired Mobile Station (MS) and a Base Transceiver Station (BTS) antenna of a one of a plurality of sectors of a BTS in presence of an interfering MS.

An embodiment provides a method and system for estimating a channel between a desired MS and a BTS antenna of a one of a plurality of sectors of a BTS. The method includes receiving a composite signal at the BTS antenna. The composite signal comprises a desired MS signal and an interfering MS signal. The composite signal comprises a plurality of pilot symbols and data symbols from each of the desired and interfering MS signals. Thereafter, a known desired random sequence and a known interfering random sequence is applied to pilot symbols of the composite signal, resulting in a first de-randomized signal and a second de-randomized signal. Finally, the channel estimate is obtained by weighting and summing the first de-randomized signal and second de-randomized signal.

BRIEF DESCRIPTION OF THE DRAWINGS

A more complete appreciation of the present invention is provided by reference to the following detailed description when considered in conjunction with the accompanying drawings in which reference symbols indicate the same or similar components, wherein.

DETAILED DESCRIPTION OF THE DRAWINGS

Various embodiments provide methods and systems for estimating channel between a desired Mobile Station (MS) and a Base Transceiver Station (BTS) antenna of a BTS in a communication system. Examples of the communication system include wireless communication systems, for example, GSM, CDMA, OFDMA, and OFDM. The BTS antenna receives a composite signal from the desired MS and an interfering MS. The desired MS signal and the interfering MS signal include overlapping time and frequency data symbols. Additionally, the desired MS signal and the interfering MS include overlapping time and frequency pilot symbols. The BTS antenna demodulates the composite signal by applying a known desired random sequence and a known interfering random sequence to pilot symbols of the composite signal. Demodulation of the composite signal results into a first de-randomized signal and a second de-randomized signal. Finally, channel estimate is obtained by weighting and summing the first de-randomized signal and the second de-randomized signal.

Figure 1:
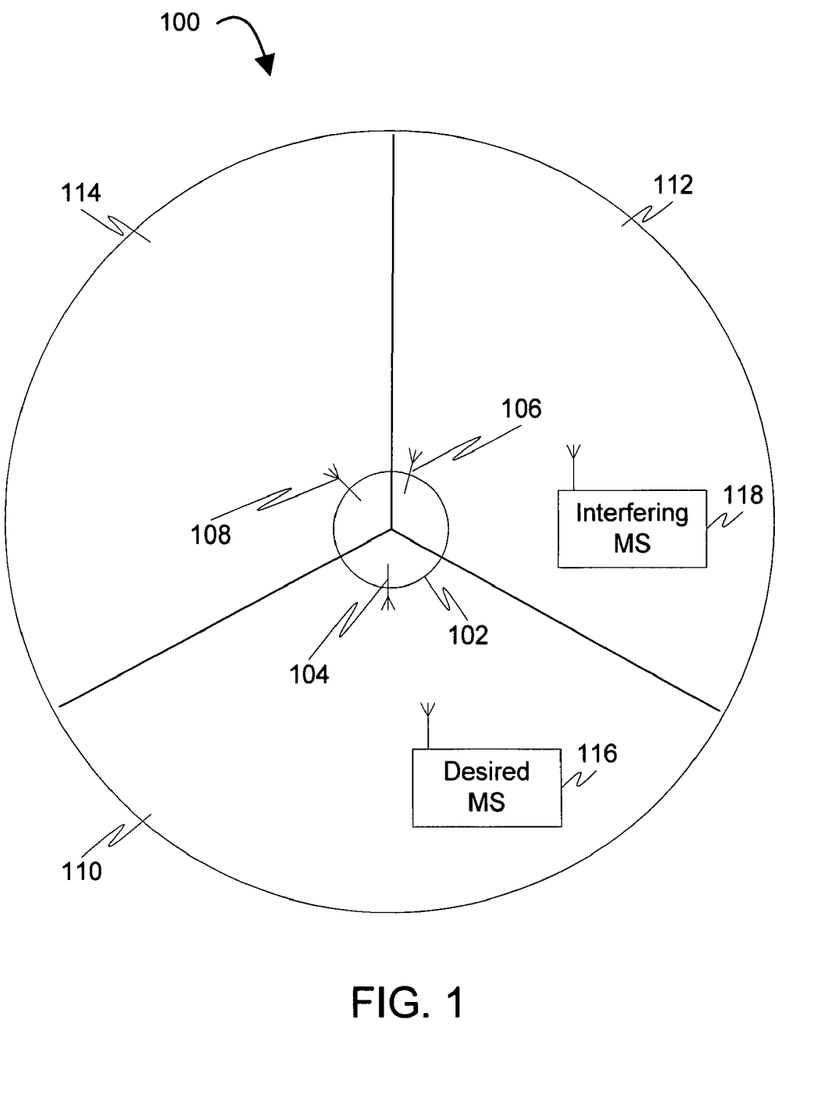
FIG. 1 is a block diagram showing an environment (that is exemplary) in which various embodiments of the invention may function.

FIG. 1 is a block diagram showing an environment 100 (that is exemplary) in which various embodiments of the invention may function. Environment 100 includes a BTS 102. Base Transceiver Station (BTS) 102 includes a BTS antenna 104, a BTS antenna 106, and a BTS antenna 108. It will be apparent to a person skilled in the art that BTS 102 may include more than three BTS antennas. BTS 102 serves Mobile Stations (MSs) in a plurality of sectors (for example, a sector 110, a sector 112, and a sector 114) in a geographic region. One or more BTS antennas of BTS 102 serve one or more MSs in the corresponding sector in a geographic region. For example, BTS antenna 104 serves one or more MSs in sector 110, BTS antenna 106 serves one or more MSs in sector 112, and BTS antenna 108 serve one or more MSs in sector 114.

A desired MS 116 is served by BTS antenna 104. Desired MS 116 transmits signal to BTS antenna 104. The signal transmitted by desired MS 116 may be received at each of BTS antenna 106 and BTS antenna 108. However, the signal received from desired MS 116 at BTS antenna 106 may be interfered by a signal transmitted by an interfering MS 118, which is served by BTS antenna 106. In this case, the channel between desired MS 116 and BTS antenna 106 is estimated in presence of interfering MS 118.

Figure 2:
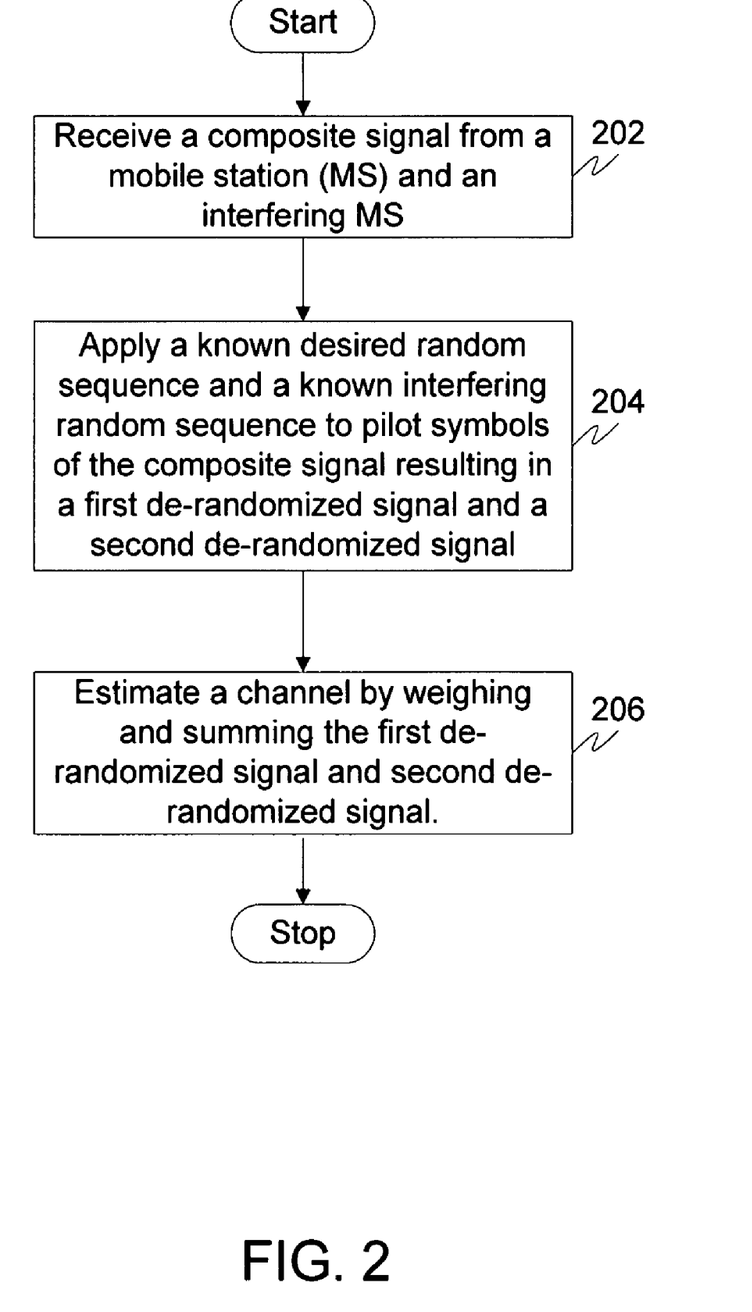
FIG. 2 is a flowchart of a method for estimating channel between a desired Mobile Station (MS) and a Base Transceiver Station (BTS) antenna in a communication system, in accordance with an embodiment.

FIG. 2 is a flowchart of a method for estimating channel between desired MS 116 and BTS antenna 106 of sector 112 in a communication system, in accordance with an embodiment. At 202, BTS antenna 106 receives a composite signal that includes a desired MS signal transmitted by desired MS 116 and an interfering MS signal transmitted by interfering MS 118. In an embodiment, a second channel may be estimated between desired MS 116 and a second BTS antenna (not shown in FIG. 1) of sector 112. In this case, the second BTS antenna of sector 112 receives a composite signal that includes a desired MS signal transmitted by desired MS 116 and an interfering MS signal transmitted by interfering MS 118. The desired MS signal and the interfering MS signal include overlapping time and frequency data symbols, and overlapping time and frequency pilot symbols. Desired MS 116 modulates the desired MS signal using a first Pseudo Random Binary Sequence (PRBS) before transmitting the desired MS signal. The known desired random sequence includes the first PRBS. The first PRBS includes a first plurality of pseudo random binary values. A pseudo random binary value may be one of +1 and −1. Similarly, interfering MS 118 modulates the interfering MS signal using a second PRBS before transmitting the interfering MS signal. The known interfering random sequence includes the second PRBS. The second PRBS includes a second plurality of pseudo random binary values.

The composite signal received by BTS antenna 106 from desired MS 116 and interfering MS 118 at a pilot sub-carrier location may be represented by equation (1) given below:

$$Y_{i,j} = C^{(1)}_{i,j} h + C^{(2)}_{i,j} g + n_{i,j} \quad (1)$$

where,
- $Y_{i,j}$, is the composite signal received by the BTS antenna 106 at $i^{th}$ sub-carrier and $j^{th}$ OFDM time symbol,
- h is the channel response between desired MS 116 and BTS antenna 106,
- g is the channel response between interfering MS 118 and BTS antenna 106,
- $n_{i,j}$ is the noise in the channel at $i^{th}$ sub-carrier and $j^{th}$ OFDM time symbol,
- $C^{(1)}_{i,j}$ is a pseudo random binary value corresponding to a $i^{th}$ sub-carrier and $j^{th}$ OFDM time symbol in the first PRBS, and
- $C^{(2)}_{i,j}$ is a pseudo random binary value corresponding to a $i^{th}$ sub-carrier and $j^{th}$ OFDM time symbol in the second PRBS, each of $C^{(1)}_{i,j}$ and $C^{(2)}_{i,j}$ can have a value of +1 or −1.

At 204, the known desired random sequence and the known interfering random sequence is applied to pilot symbols of the composite signal. This results in a first de-randomized signal and a second de-randomized signal. For estimating the second channel, the known desired random sequence and the known interfering random sequence is applied to pilot symbols of the composite signal received at the second BTS antenna of sector 112. This results in a first de-randomized signal and a second de-randomized signal corresponding to the composite signal received at the second BTS antenna of sector 112. The known desired random sequence and the known interfering random sequence may be applied to pilot symbols of the composite signal by multiplying each pseudo random value corresponding to a pilot sub-carrier in the first PRBS and each pseudo random value corresponding to a pilot sub-carrier in the second PRBS with the corresponding pilot symbols of the composite signal. In an embodiment, the first de-randomized signal corresponding to a pilot symbol may be represented by equation (2) given below:

$$P_{i,j} = h + C^{(1)}_{i,j} C^{(2)}_{i,j} g \quad (2)$$

where,
$P_{i,j}$, is the first signal at $i^{th}$ sub-carrier and $j^{th}$ OFDM time symbol.

Similarly, in an embodiment, the second de-randomized signal corresponding to a pilot symbol may be represented by equation (3) given below:

$$Q_{i,j} = C^{(1)}_{i,j} C^{(2)}_{i,j} h + g \quad (3)$$

where,
$Q_{i,j}$, is the second signal at $i^{th}$ sub-carrier and $j^{th}$ OFDM time symbol.

At 206, weighing and summing of the first de-randomized signal and the second de-randomized signal is performed to obtain an estimate of the channel between desired MS 116 and the BTS antenna 106. This has been explained in detail in conjunction with FIG. 3. For estimating the second channel, weighing and summing of the first de-randomized signal and the second de-randomized signal is performed corresponding to the composite signal received at the second BTS antenna of sector 112.

In an embodiment, a different sector channel may be estimated between desired MS 116 and a first BTS antenna of a different sector of the plurality of sectors of BTS 102. The different sector may be one of sector 110 and sector 114. In this case, the first BTS antenna of the different sector receives a composite signal that includes a desired MS signal transmitted by desired MS 116 and an interfering MS signal transmitted by interfering MS 118. Thereafter, the known desired random sequence and the known interfering random sequence is applied to pilot symbols of the composite signal received at the first BTS antenna of the different sector. This results in a first de-randomized signal and a second de-randomized signal corresponding to the composite signal received at the first BTS antenna of the different sector. Further, to estimate the different sector channel, weighing and summing of the first de-randomized signal and the second de-randomized signal corresponding to the composite signal received at the first BTS antenna of the different sector is performed. Therefore, the different sector channel may be used in conjunction with the channel estimated between desired MS 116 and BTS antenna 106 to achieve sector combining.

Figure 3:
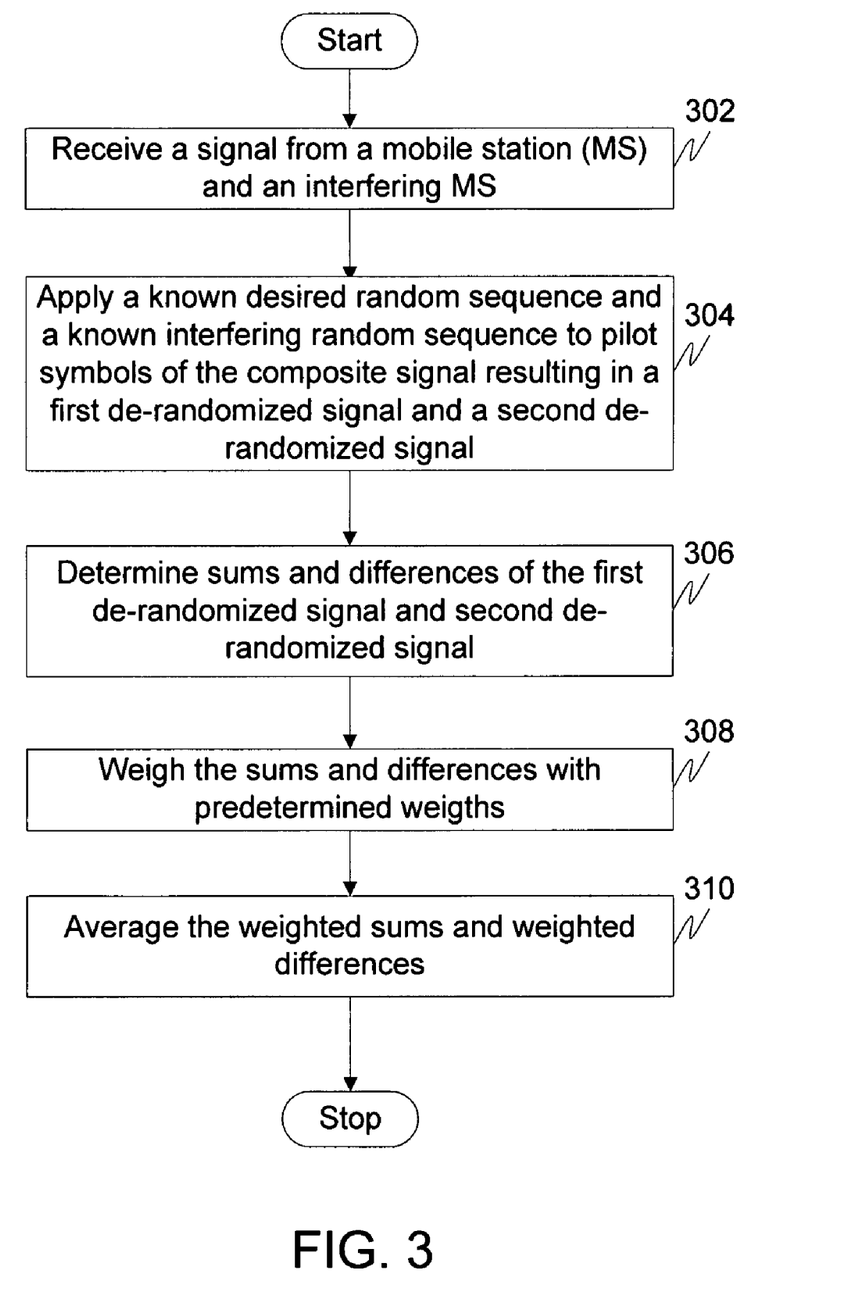
FIG. 3 is a flowchart of a method for estimating channel between a desired MS and a BTS antenna in a communication system, in accordance with another embodiment.

FIG. 3 is a flowchart of a method for estimating channel between desired MS 116 and BTS antenna 106 in a communication system, in accordance with another embodiment. At 302, the BTS antenna receives a composite signal from desired MS 116 and interfering MS 118. Therefore, the composite signal includes the desired MS signal and the interfering MS signal. The desired MS signal and the interfering MS signal have overlapping time and frequency data symbols, and overlapping time and frequency pilot symbols. At 304, a known desired random sequence and a known interfering random sequence is applied to pilot symbols of the composite signal. This results in the first de-randomized signal and the second de-randomized signal. The known desired random sequence includes the first PRBS and the known interfering random sequence includes the second PRBS. This has been explained in detail in conjunction with FIG. 2 given above.

Further, a PRBS characteristic value corresponding to the first PRBS and the second PRBS is determined at 304. The PRBS characteristic value is determined by adding the product of each pseudo random binary value corresponding to a pilot sub-carrier in first PRBS and the corresponding pseudo random binary value corresponding to the same pilot sub-carrier in the second PRBS. The PRBS characteristic value may be equal to one of 4, 2, 0, −2, and −4. In an embodiment, the PRBS characteristic value may be represented by equation (4) given below:

$$\text{PRBS characteristic value} = \sum_{i,j} C_{ij}^{(1)} C_{ij}^{(2)} \quad (4)$$

where the summation is over all pairs (i,j) such that the $i^{th}$ sub-carrier and the $j^{th}$ OFDM time symbol corresponds to a pilot sub-carrier location.

At 306, sums and differences of the first de-randomized signal and the second de-randomized signal are determined. The sums of the first de-randomized signal and the second de-randomized signal include a sum of each pilot symbol in the first de-randomized signal and the corresponding pilot symbol in the second de-randomized signal. In an embodiment, the sum of the first de-randomized signal and the second de-randomized signal corresponding to a pilot symbol may be represented by equation (5) given below:

$$P_{i,j} + Q_{i,j} = (h + C^{(1)}_{i,j} C^{(2)}_{i,j} g)_+ (C^{(1)}_{i,j} C^{(2)}_{i,j} h + g) \quad (5)$$

The differences of the first de-randomized signal and the second de-randomized signal include a difference of each pilot symbol in the first de-randomized signal and the corresponding pilot symbol in the second de-randomized signal. Further, in an embodiment, the difference of the first de-randomized signal and the second de-randomized signal corresponding to a pilot symbol may be represented by equation (6) given below:

$$P_{i,j} - Q_{i,j} = (h + C^{(1)}_{i,j} C^{(2)}_{i,j} g) - (C^{(1)}_{i,j} C^{(2)}_{i,j} h + g) \quad (6)$$

After determining sums and differences, the sums and differences are weighted with predetermined weights, at 306. In this case, a power level of interfering MS signal is sensed. If the power level of the interfering MS signal is below a threshold, then the second de-randomized signal is set to zero. Additionally, each of the predetermined weighting is set to ½.

In another embodiment, a first weight and a second weight are selected based on the PRBS characteristic value. Thereafter, the sums are weighed with the first weight and the difference is weighed with the second weight. Each of the first weight and the second weight have a value equal to one of ½, ⅓, 1 and 0. A value of ½ is selected for the first weight and a value of 0 is selected for the second weight if the PRBS characteristic value is equal to 4. A value of ⅓ is selected for the first weight and a value of 1 is selected for the second weight if the PRBS characteristic value is equal to 2. Further, a value of ½ is selected for the first weight and a value of ½ is selected for the second weight if the PRBS characteristic value is 0. A value of 1 is selected for the first weight and a value of ⅓ is selected for the second weight if the PRBS characteristic value is equal to -2. A value of 0 is selected for the first predetermined weight and a value of ½ is selected for the second predetermined weight if the PRBS characteristic value is equal to -4. The above listed values of the first weight and the second predetermined weight determined corresponding to the PRBS characteristic value may be represented by Table 1 given below:

TABLE 1

| PRBS characteristic value $\sum_{i,j} C_{ij}^{(1)} C_{ij}^{(2)}$ | First predetermined weight (K1) | Second predetermined weight (K2) |
|---|---|---|
| 4 | ½ | 0 |
| 2 | ⅓ | 1 |
| 0 | ½ | ½ |
| -2 | 1 | ⅓ |
| -4 | 0 | ½ |

After selecting the first weight and the second weight based on the PRBS characteristic value, to obtain the weighted sums, the first weight is multiplied with each of the pilot symbol of the sums of the first de-randomized signal and the second de-randomized signal. In an embodiment, the multiplication corresponding to a pilot symbol may be represented by expression (10), as given below:

$$K1 \times (P_{i,j} + Q_{i,j}) \quad (10)$$

where,
K1 is the weight as shown in Table 1.

Similarly, to obtain weighted differences, the second weight is multiplied with each of the pilot symbol of the differences of the first de-randomized signal and second de-randomized signal. In an embodiment, the multiplication corresponding to a pilot symbol may be represented by expression (11), as given below:

$$K2 \times (P_{i,j} - Q_{i,j}) \quad (11)$$

where,
K2 is the second predetermined weight as shown in Table 1.

Thereafter, at step 310, the weighted sums and the weighted differences are averaged over pilot symbols. The average is obtained by summing the plurality of pilot symbols in the weighted sums and the plurality of pilot symbols in the weighted differences and dividing the sum obtained by the number of pilot symbols. The average gives the estimate of the channel between desired MS 116 and BTS antenna 106. In an embodiment, the average of the weighted sums and the weighted differences may be represented by expression (12) given below:

$$\left( \sum_{i,j} K1(P_{i,j} + Q_{i,j}) + \sum_{i,j} K2(P_{i,j} - Q_{i,j}) \right) / m \quad (12)$$

where,
'm' is the number of pilot symbols used in the signals transmitted by desired MS 116 and interfering MS 118.

Figure 4:
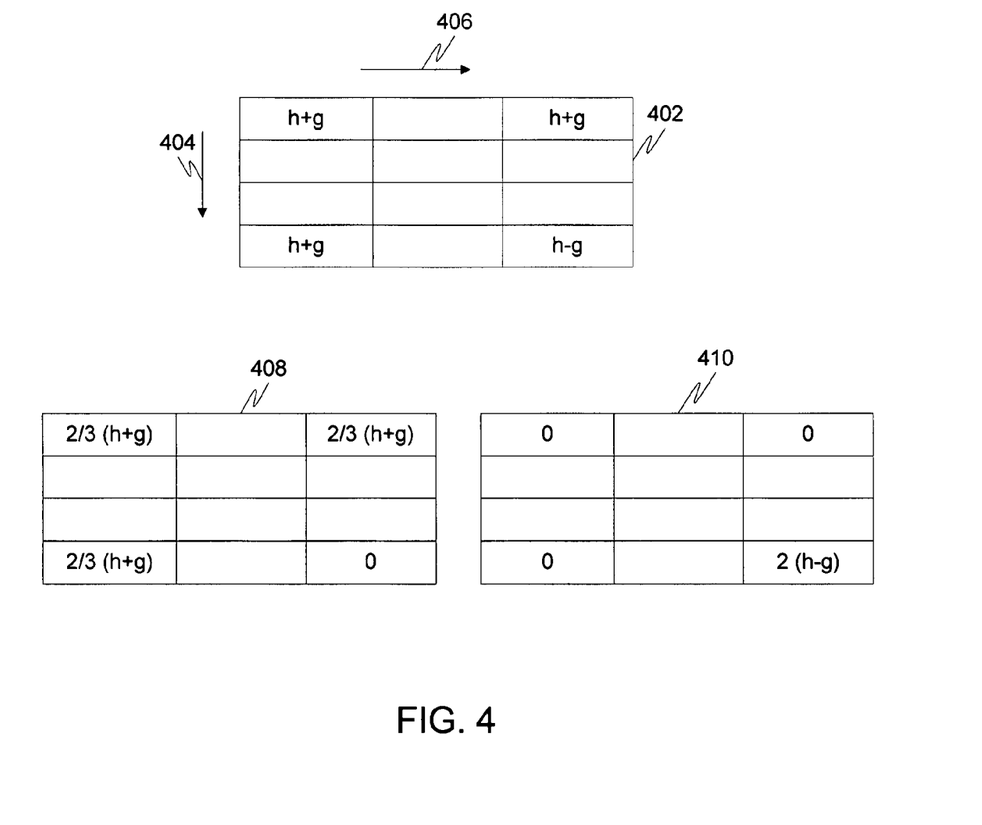
FIG. 4 is a block diagram illustrating channel estimation between a desired MS and a BTS antenna in a communication system, in accordance with an exemplary embodiment.

FIG. 4 is a block diagram illustrating channel estimation between desired MS 116 and BTS antenna 106 in a communication system, in accordance with an exemplary embodiment. The BTS antenna receives a composite signal from desired MS 116 and interfering MS 118. The composite signal includes the desired MS signal and the interfering MS signal. The desired MS signal is modulated by desired MS 116 using a first PRBS and the interfering MS signal is modulated by interfering MS 118 using a second PRBS.

Referring back to FIG. 2, the signal received at BTS antenna 106 at each pilot sub-carrier location may be represented by equations given below:

$$Y_{1,1} = C^{(1)}_{1,1} h + C^{(2)}_{1,1} g = h + g$$

$$Y_{1,3} = C^{(1)}_{1,3} h + C^{(2)}_{1,3} g = h + g$$

$$Y_{4,1} = C^{(1)}_{4,1}h + C^{(2)}_{4,1}g = h+g$$

$$Y_{4,3} = C^{(1)}_{4,3}h + C^{(2)}_{4,3}g = h-g$$

where, $Y_{1,1}$ is the signal received at first sub-carrier and first OFDM time symbol $Y_{1,3}$ is the signal received at first sub-carrier and third OFDM time symbol $Y_{4,1}$ is the signal received at fourth sub-carrier and first OFDM time symbol $Y_{4,3}$ is the signal received at fourth sub-carrier and third OFDM time symbol In this exemplary embodiment, the values of pseudo random binary values in the first PRBS corresponding to each pilot symbol are given as $C^{(1)}_{11}=+1$, $C^{(1)}_{13}=+1$, $C^{(1)}_{41}=+1$ and $C^{(1)}_{43}=+1$. The values of pseudo random binary values in the second PRBS corresponding to each pilot symbol are given as $C^{(2)}_{11}=+1$, $C^{(2)}_{13}=+1$, $C^{(2)}_{41}=+1$ and $C^{(2)}_{43}=-1$.

The signal received at BTS antenna 106 from desired MS 116 and interfering MS 118 is represented by a tile 402. Tile 402 includes four symbols along a frequency dimension 404 and three consecutive time symbols along a time dimension 406.

Thereafter, the first PRBS is applied on the composite signal to generate a first de-randomized signal ($P_{i,j}$). For this, each of the pseudo random binary value ($C^{(1)}_{11}$, $C^{(1)}_{13}$, $C^{(1)}_{41}$ and $C^{(1)}_{43}$) of the first PRBS is multiplied with the corresponding pilot symbol of the composite signal to generate the first de-randomized signal for each pilot symbol which is represented by equations below:

$$P_{1,1} = h + C^{(1)}_{1,1}C^{(2)}_{1,1}g = h+g$$

$$P_{1,3} = h + C^{(1)}_{1,3}C^{(2)}_{1,3}g = h+g$$

$$P_{4,1} = h + C^{(1)}_{4,1}C^{(2)}_{4,1}g = h+g$$

$$P_{4,3} = h + C^{(1)}_{4,3}C^{(2)}_{4,3}g = h-g$$

Similarly, BTS 102 applies the second PRBS on the composite signal to generate a second de-randomized signal ($Q_{i,j}$). For this, each of the pseudo random binary value ($C^{(2)}_{11}$, $C^{(2)}_{13}$, $C^{(2)}_{41}$ and $C^{(2)}_{43}$) of the second PRBS is multiplied with the corresponding pilot symbol of the composite signal to generate the second de-randomized signal for each pilot symbol which is represented by equations given below:

$$Q_{1,1} = C^{(2)}_{1,1}C^{(1)}_{1,1}h + g = h+g$$

$$Q_{1,3} = C^{(2)}_{1,3}C^{(1)}_{1,3}h + g = h+g$$

$$Q_{4,1} = C^{(2)}_{4,1}C^{(1)}_{4,1}h + g = h+g$$

$$Q_{4,3} = C^{(2)}_{4,3}C^{(1)}_{4,3}h + g = -h+g$$

Further, a PRBS characteristic value is determined by adding the product of each pseudo random binary value corresponding to a pilot sub-carrier in the first PRBS and the corresponding pseudo random binary value corresponding to the same pilot sub-carrier in the second PRBS. The PRBS characteristic value is represented by equations given below:

$$\sum_{i=1,4, j=1,3} C^{(1)}_{ij}C^{(2)}_{ij} = C^{(1)}_{1,1}C^{(2)}_{1,1} + C^{(1)}_{1,3} + C^{(2)}_{1,3} + C^{(1)}_{4,1}C^{(2)}_{4,1} + C^{(1)}_{4,3}C^{(2)}_{4,3}$$

$$= 1.1 + 1.1 + 1.1 + 1.(-1)$$

$$= 1 + 1 + 1 - 1$$

$$= +2$$

Thereafter, sums and differences of the first de-randomized signal and second de-randomized signal are determined. The sums of the first de-randomized signal and the second de-randomized signal may be represented by equations given below:

$$P_{1,1} + Q_{1,1} = (h+g)_+(h+g) = 2(h+g)$$

$$P_{1,3} + Q_{1,3} = (h+g)_+(h+g) = 2(h+g)$$

$$P_{4,1} + Q_{4,1} = (h+g)_+(h+g) = 2(h+g)$$

$$P_{4,3} + Q_{4,3} = (h+g)_+(-h-g) = 0$$

The differences of the first de-randomized signal and the second de-randomized signal may be represented by equations given below:

$$P_{1,1} - Q_{1,1} = (h+g) - (h+g) = 0$$

$$P_{1,3} - Q_{1,3} = (h+g) - (h+g) = 0$$

$$P_{4,1} - Q_{4,1} = (h+g) - (h+g) = 0$$

$$P_{4,3} - Q_{4,3} = (h+g) - (h+g) = 2(h-g)$$

Thereafter, a first weight (K1) and a second weight (K2) are selected based on the PRBS characteristic value using Table 1. Therefore, the first weight is determined as ⅓ (K1=⅓) and the second weight is determined as 1 (K2=1) corresponding to the PRBS characteristic value of +2.

Next, the first weight is applied to the sums of the first de-randomized signal and the second de-randomized signal. The first weight is multiplied with the signal at each of the pilot sub-carrier locations of the sums of the first de-randomized signal and the second de-randomized signal. The multiplication is represented by equations given below:

$$K1(P_{1,1} + Q_{1,1}) = (⅓) \cdot 2(h+g) = ⅔(h+g)$$

$$K1(P_{1,3} + Q_{1,3}) = (⅓) \cdot 2(h+g) = ⅔(h+g)$$

$$K1(P_{4,1} + Q_{4,1}) = (⅓) \cdot 2(h+g) = ⅔(h+g)$$

$$K1(P_{4,3} + Q_{4,3}) = (⅓) \cdot 0 = 0$$

The above listed equations may be represented as a tile 408.

Similarly, the second weight is applied to the differences of the first de-randomized signal and the second de-randomized signal. The second weight is multiplied with the signal at each of the pilot sub-carrier locations of the differences of the first de-randomized signal and the second de-randomized signal. The multiplication is represented by equations given below:

$$Q_{1,1} = K2(P_{1,1} - Q_{1,1}) = (1) \cdot 0 = 0$$

$$Q_{1,3} = K2(P_{1,3} - Q_{1,3}) = (1) \cdot 0 = 0$$

$$Q_{4,1} = K2(P_{4,1} - Q_{4,1}) = (1) \cdot 0 = 0$$

$$Q_{4,3} = K2(P_{4,4} - Q_{4,3}) = (1) \cdot 2(h-g) = 2(h-g)$$

The above listed equations may be represented as a tile 410.

Thereafter, linear averaging on the pilot symbols of tile 408 and tile 410 is performed as represented by equation given below:

$$\text{Average} = \left[ \begin{array}{c} (2/3(h+g) + 2/3(h+g) + 2/3(h+g) + 0) + \\ (0 + 0 + 0 + 2(h-g)) \end{array} \right] / 4$$

$$= h$$

The average is the estimate of the channel between desired MS 116 and BTS antenna 106 at sector 112.

Figure 5:
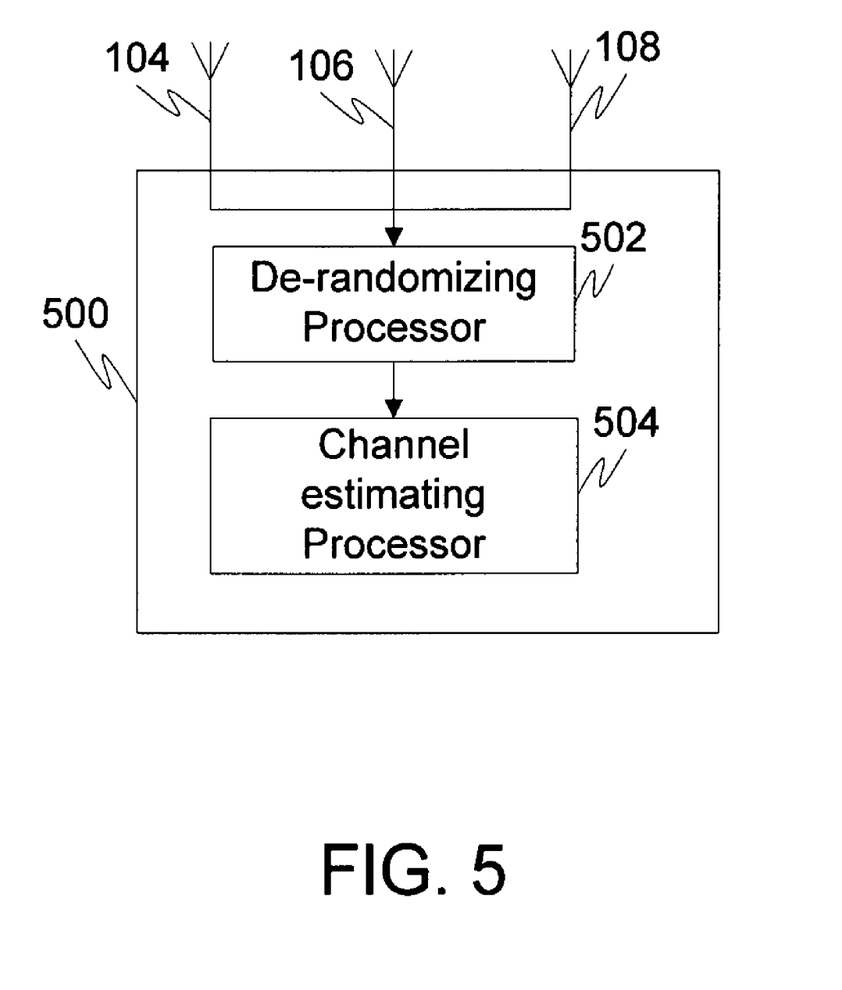
FIG. 5 is a bock diagram showing various components of a BTS for estimating channel between a desired MS and a BTS antenna, in accordance with an embodiment.

FIG. 5 is a block diagram showing various components of a BTS 500 for estimating channel between desired MS 116 and BTS antenna 106, in accordance with an embodiment. BTS 500 serves MSs in a plurality of sectors (for example, sector 110, sector 112, and sector 114) in a geographic region. BTS 500 includes a plurality of BTS antennas (for example, BTS antenna 104, BTS antenna 106, and BTS antenna 108), a de-randomizing processor 502 operatively coupled to each BTS antenna, and a channel estimating processor 504 operatively coupled to de-randomizing processor 502. One or more BTS antennas of BTS 500 serve a sector in the plurality of sectors. For example, BTS antenna 106 serves one or more MSs in sector 112 in the plurality of sectors of the BTS 500.

BTS antenna 106 receives a composite signal from desired MS 116 and interfering MS 118. Desired MS 116 is served by BTS antenna 104 in sector 110 and the interfering MS 118 is served by BTS antenna 106 in sector 112. The composite signal includes a desired MS signal and an interfering MS signal. The desired MS signal and the interfering MS signal have overlapping time and frequency data symbols. Additionally, the desired MS signal and the interfering MS signal have overlapping time and frequency pilot symbols. Desired MS 116 modulates the desired MS signal using a first PRBS before transmitting the desired MS signal. Similarly, interfering MS 118 modulates the interfering MS signal using a second PRBS before transmitting the interfering MS signal. The first PRBS includes a first plurality of pseudo random binary values and the second PRBS includes a second plurality of pseudo random binary values. A pseudo random binary value in a PRBS is one of +1 or −1 and corresponds to a pilot/data symbol in the tile.

After BTS antenna 106 receives the composite signal, de-randomizing processor 502 applies a known desired random sequence and a known interfering random sequence to pilot symbols of the composite signal. This results in a first de-randomized signal and a second de-randomized signal. The known desired random sequence includes the first PRBS and the known interfering random sequence includes the second PRBS.

Thereafter, channel estimating processor 504 estimates the channel by weighing and summing the first de-randomized signal and the second de-randomized signal. For this, channel estimating processor 504 determines sums and differences of the first de-randomized signal and second de-randomized signal. This has been explained in detail in conjunction with FIG. 3 and FIG. 4. In an embodiment, channel estimating processor 504 weighs the sums and weighs the differences with predetermined weights to obtain weighted sums and weighted differences. In this case, a power level of interfering MS signal is sensed. If the power level of the interfering MS signal is below a threshold, then the second de-randomized signal is set to zero. Additionally, each of the predetermined weighting is set to ½.

In another embodiment, channel estimating processor 504 determines a PRBS characteristic value corresponding to the first PRBS and the second PRBS. The PRBS characteristic value is determined by adding the product of each pseudo random binary value corresponding to a pilot sub-carrier in first PRBS and the corresponding pseudo random binary value corresponding to the same pilot sub-carrier in the second PRBS. Based on the PRBS characteristic value, channel estimating processor 504 selects a first weight and a second weight. This has been explained in conjunction with Table 1 given above. In this case, channel estimating processor 504 weighs the sums with the first weight to obtain the weighted sums and weighs the differences with the second weight to obtain the weighted differences. Finally, channel estimating processor 504 adds the weighted sums and the weighted differences. Channel estimating processor 504 may average the weighted sums and the weighted differences over pilot symbols. The average is obtained by summing the plurality of pilot symbols in the weighted sums and the plurality of pilot symbols in the weighted differences and dividing the sum obtained by the number of pilot symbols. The average gives the estimate of the channel between desired MS 116 and BTS antenna 106.

Various embodiments provide methods and systems estimating a channel between a desired MS and a BTS antenna of a one of a plurality of sectors of a BTS. The system receives and processes signals from the desired MS and an interfering MS to cancel out the interference due to the interfering MS. This may be used to improve the output of sector combining procedure. Further, sector combining may not be performed in case the interference is not cancelled out. Additionally, the system uses the same channel estimator as used in conventional systems in order to obtain the estimate of the channel. This reduces the modifications to be made to the conventional system to achieve the above listed methods and systems.

What is claimed is:

1. A method of estimating a channel between a desired Mobile Station (MS) and a Base Transceiver Station (BTS) antenna of a one of a plurality of sectors of a BTS, comprising:
   the BTS receiving a composite signal, the composite signal comprising a desired MS signal and an interfering MS signal, wherein the desired MS signal is modulated by a first Pseudo Random Binary Sequences (PRBS) and the interfering MS signal is modulated by a second PRBS, and wherein the known desired random sequence comprises the first PRBS and the known interfering random sequence comprises the second PRBS;
   generating a first de-randomized signal, comprising multiplying a known desired random sequence by pilot symbols of the composite symbol;
   generating a second de-randomized signal, comprising multiplying a known interfering random sequence by pilot symbols of the composite symbol;
   the BTS estimating the channel by weighting and summing the first de-randomized signal and second de-randomized signal, comprising determining sums and differences of the first de-randomized signal and the second de-randomized signal, weighting the sums and weighting the differences with predetermined weights, and averaging the weighted sums and weighted differences, wherein the weighting for the sums and the weighting for the differences with predetermined weights comprises determining a PRBS characteristic value corresponding to the first PRBS and the second PRBS.

2. The method of claim 1, wherein the desired MS signal and the interfering MS signal comprise overlapping time and frequency data symbols, and overlapping time and frequency pilot symbols.

3. The method of claim 1, wherein the first PRBS and the second PRBS comprise pseudo random binary values of one of +1 and −1.

4. The method of claim 1, further comprising sensing a power level of the interfering MS signal, if the power level is below a threshold, then setting the second de-randomized signal to zero, and setting each of the weighting to ½.

5. The method of claim 1, further comprising estimating a second channel between the desired MS and a second BTS antenna of the one of the plurality of sectors of the BTS, comprising:

the second BTS antenna receiving a composite signal, the composite signal comprising a desired MS signal and an interfering MS signal;

applying the known desired random sequence and the known interfering random sequence to pilot symbols of the composite signal, resulting in a first de-randomized signal and a second de-randomized signal;

estimating the second channel by weighting and summing the first de-randomized signal and second de-randomized signal.

6. The method of claim 1, further comprising estimating a different sector channel between the desired MS and a first BTS antenna of a different one of the plurality of sectors of the BTS, comprising:

the first BTS antenna receiving a composite signal, the composite signal comprising a desired MS signal and an interfering MS signal;

applying the known desired random sequence and the known interfering random sequence to pilot symbols of the composite signal, resulting in a first de-randomized signal and a second de-randomized signal;

estimating the different sector channel by weighting and summing the first de-randomized signal and second de-randomized signal.

7. The method of claim 1, wherein the PRBS characteristic value is determined by adding the product of each pseudo random binary value corresponding to a pilot sub-carrier in first PRBS and the corresponding pseudo random binary value corresponding to the same pilot sub-carrier in the second PRBS.

8. The method of claim 7, wherein the PRBS characteristic value is equal to one of 4, 2, 0, −2, and −4, and the method further comprises:

determining sums and differences of the first de-randomized signal and the second de-randomized signal;

weighting the sums with a first weight and weighting the differences with a second weight, wherein the first weight and the second weight comprise a value equal to at least one of ½, ⅓, 1 and 0; and averaging the weighted sums and weighted differences.

9. The method of claim 8, wherein:

a value of ½ is selected for the first weight and a value of 0 is selected for the second weight if the PRBS characteristic value is equal to 4;

a value of ⅓ is selected for the first weight and a value of 1 is selected for the second weight if the PRBS characteristic value is equal tot;

a value of ½ is selected for the first weight and a value of ½ is selected thr the second weight if the PRBS characteristic value is 0;

a value of 1 is selected for the first weight and a value of ⅓ is selected for the second weight if the PRBS characteristic value is equal to −2; and a value of 0 is selected for the first weight and a value of ½ is selected for the second weight if the PRBS characteristic value is equal to −4.

10. A Base Transceiver Station (BTS) for estimating a channel of a desired Mobile Station (MS) in a communication system, the BTS comprising:

a plurality of BTS antennas, wherein a BTS antenna of a one of a plurality of sectors of the BTS is configured to receive a composite signal, the composite signal comprises the desired MS signal transmitted by the desired MS and the interfering MS signal transmitted by the interfering MS, wherein the interfering MS is served by the BTS antenna and the desired MS is served by a BTS antenna of a different one of a plurality of sectors, wherein the desired MS signal is modulated by a first Pseudo Random Binary Sequences (PRBS) and the interfering MS signal is modulated by a second PRBS, and wherein the known desired random sequence comprises the first PRBS and the known interfering random sequence comprises the second PRBS; and a de-randomizing processor operatively coupled to the BTS antenna, the de-randomizing processor configured to generate a first de-randomized signal, comprising multiplying a known desired random sequence by pilot symbols of the composite symbol, and to generate a second de-randomized signal, comprising multiplying a known interfering random sequence by pilot symbols of the composite symbol; and a channel estimating processor operatively coupled with the de-randomizing processor, wherein the channel estimating processor is configured to estimate the channel by weighting and summing the first de-randomized signal and second de-randomized signal, comprising determining sums and differences of the first de-randomized signal and the second de-randomized signal, weighting the sums and weighting the differences with predetermined weights, and averaging the weighted sums and weighted differences, wherein the weighting for the sums and the weighting for the differences with predetermined weights comprises determining a PRBS characteristic value corresponding to the first PRBS and the second PRBS.

11. The BTS of claim 10, wherein the PRBS characteristic value is determined by adding the product of each pseudo random binary value corresponding to a pilot sub-carrier in first PRBS and the corresponding pseudo random binary value corresponding to the same pilot sub-carrier in the second PRBS.

12. The BTS of claim 10, wherein the PRBS characteristic value is equal to one of 4, 2, 0, −2, and −4, and the method further comprises:

determining sums and differences of the first de-randomized signal and the second de-randomized signal;

weighting the sums with a first weight and weighting the differences with a second weight, wherein the first weight and the second weight comprise a value equal to at least one of ½, ⅓, 1 and 0; and averaging the weighted sums and weighted differences.

* * * * *